US011713686B2

(12) United States Patent
Taylor et al.

(10) Patent No.: US 11,713,686 B2
(45) Date of Patent: Aug. 1, 2023

(54) OUTLET GUIDE VANES

(71) Applicant: Oscar Propulsion Ltd., Guildford (GB)

(72) Inventors: David Taylor, Guildford (GB); Phillip Joseph, Guildford (GB); Chaitanya Paruchuri, Guildford (GB)

(73) Assignee: Oscar Propulsion Ltd., West Sussex (GB)

( * ) Notice: Subject to any disclaimer, the term of this patent is extended or adjusted under 35 U.S.C. 154(b) by 58 days.

(21) Appl. No.: 16/613,201

(22) PCT Filed: May 16, 2018

(86) PCT No.: PCT/GB2018/051325
§ 371 (c)(1),
(2) Date: Nov. 13, 2019

(87) PCT Pub. No.: WO2018/211270
PCT Pub. Date: Nov. 22, 2018

(65) Prior Publication Data
US 2020/0200017 A1    Jun. 25, 2020

(30) Foreign Application Priority Data

May 16, 2017   (GB) ..................................... 1707836
Nov. 27, 2017  (GB) ..................................... 1719662

(51) Int. Cl.
*F01D 5/28*    (2006.01)
*F01D 5/14*    (2006.01)
*F01D 5/16*    (2006.01)

(52) U.S. Cl.
CPC ............... *F01D 5/28* (2013.01); *F01D 5/147* (2013.01); *F01D 5/16* (2013.01); *F05D 2220/36* (2013.01);
(Continued)

(58) Field of Classification Search
CPC ... F01D 5/28; F01D 5/147; F01D 5/16; F01D 25/162; F01D 9/041; F05D 2220/36;
(Continued)

(56) References Cited

U.S. PATENT DOCUMENTS 1,829,674 A * 10/1931 Rosenlocher ........... F01D 25/32
                                                            96/188
1,946,129 A *  2/1934 Cebulski ............... B64C 11/205
                                                            416/224
(Continued)

FOREIGN PATENT DOCUMENTS

CN         1637246 A     7/2005
CN       101153578 A     4/2008
(Continued)

OTHER PUBLICATIONS

DE 102004017096 English Machine Translation (Year: 2004).*
(Continued)

*Primary Examiner* — David E Sosnowski
*Assistant Examiner* — Wayne A Lambert
(74) *Attorney, Agent, or Firm* — Hall Estill Law Firm; Randall K. McCarthy

(57) ABSTRACT

An outlet guide vane for a turbofan engine, which results in reduced noise. The outlet guide vane may comprise an aerofoil, the aerofoil comprising at least porous section, wherein the at least one channel or porous section is positioned near the leading edge of the aerofoil.

20 Claims, 4 Drawing Sheets

(52) U.S. Cl.
CPC .... *F05D 2240/121* (2013.01); *F05D 2260/96* (2013.01); *F05D 2300/514* (2013.01)

(58) Field of Classification Search
CPC ......... F05D 2240/121; F05D 2300/514; F05D 2260/963; F05D 2260/96; Y02T 50/60
See application file for complete search history.

(56) References Cited

U.S. PATENT DOCUMENTS

| | | | | |
|---|---|---|---|---|
| 2,340,417 | A * | 2/1944 | Ellett | B64C 11/16 |
| | | | | 244/130 |
| 3,316,714 | A | 5/1967 | Smith et al. | |
| 3,402,914 | A * | 9/1968 | Kump | F01D 5/183 |
| | | | | 416/231 R |
| 3,455,412 | A * | 7/1969 | Jacobsen | F24F 13/24 |
| | | | | 181/256 |
| 3,778,188 | A * | 12/1973 | Aspinwall | F01D 5/34 |
| | | | | 416/97 R |
| 3,779,338 | A * | 12/1973 | Hayden | F04D 29/388 |
| | | | | 181/296 |
| 3,853,428 | A * | 12/1974 | Hayden | G10K 11/161 |
| | | | | 416/231 R |
| 5,257,902 | A * | 11/1993 | Atarashi | F04D 29/388 |
| | | | | 415/119 |
| 5,634,771 | A * | 6/1997 | Howard | F01D 5/282 |
| | | | | 416/241 A |
| 6,139,259 | A | 10/2000 | Ho et al. | |
| 6,439,840 | B1 * | 8/2002 | Tse | F02C 7/045 |
| | | | | 415/1 |
| 6,682,022 | B2 * | 1/2004 | Battisti | F04D 29/684 |
| | | | | 244/207 |
| 6,827,556 | B2 * | 12/2004 | Simon | F01D 5/147 |
| | | | | 415/200 |
| 7,018,172 | B2 * | 3/2006 | Prasad | F01D 5/16 |
| | | | | 415/119 |
| 7,334,998 | B2 * | 2/2008 | Jones | F01D 5/16 |
| | | | | 416/227 R |
| 7,334,999 | B2 * | 2/2008 | Aumont | C22C 49/00 |
| | | | | 416/248 |
| 7,780,420 | B1 * | 8/2010 | Matheny | F01D 5/282 |
| | | | | 416/241 R |
| 7,901,189 | B2 * | 3/2011 | Gupta | F03D 1/0675 |
| | | | | 416/500 |
| 8,226,356 | B2 * | 7/2012 | Kay | F04D 29/4213 |
| | | | | 415/119 |
| 8,333,552 | B2 * | 12/2012 | Wood | F01D 5/147 |
| | | | | 415/119 |
| 8,464,831 | B2 * | 6/2013 | Olander Burak | F02K 1/827 |
| | | | | 181/292 |
| 8,695,915 | B1 * | 4/2014 | Jones | B64C 1/40 |
| | | | | 244/1 N |
| 8,973,364 | B2 * | 3/2015 | Gilson | F02K 1/09 |
| | | | | 60/725 |
| 9,103,216 | B2 * | 8/2015 | Kennepohl | F01D 5/16 |
| 9,132,909 | B1 * | 9/2015 | Khorrami | B64C 21/10 |
| 2003/0031556 | A1 | 2/2003 | Mulcaire et al. | |
| 2009/0317237 | A1 | 12/2009 | Wood et al. | |
| 2009/0317238 | A1 | 12/2009 | Wood et al. | |
| 2009/0320488 | A1 * | 12/2009 | Gilson | F02K 1/09 |
| | | | | 60/771 |
| 2017/0218774 | A1 | 8/2017 | Bloxham | |
| 2018/0051565 | A1 * | 2/2018 | Bunker | F01D 9/041 |

FOREIGN PATENT DOCUMENTS

| | | | | |
|---|---|---|---|---|
| CN | 101307745 | A | 11/2008 | |
| CN | 106460788 | A | 2/2017 | |
| CN | 106529020 | A | 3/2017 | |
| CN | 111727313 | A | 9/2020 | |
| DE | 102004017096 | A1 * | 10/2005 | ............ F01D 5/147 |
| EP | 1343956 | A1 | 9/2003 | |
| EP | 1574668 | A2 | 9/2005 | |
| EP | 1947294 | A2 | 7/2008 | |
| EP | 2138696 | A1 | 12/2009 | |
| EP | 3121376 | A1 | 1/2017 | |
| FR | 2290589 | A1 | 6/1979 | |
| GB | 2361035 | A | 10/2001 | |
| WO | 2005057001 | A2 | 6/2005 | |
| WO | WO-2005100753 | A1 * | 10/2005 | ............ F01D 5/147 |

OTHER PUBLICATIONS

Low-Noise Exit Guide Vanes for Turbofan Jet Engines, Wayback Machine, (Year: 2009).*

"Low-Noise Exit Guide Vanes for Turbofan Jet Engines," National Aeronautics and Space Administration, 2 pps. 2009, see NPL Low-Noise Exit Guide Vanes for Turbofan Jet Engines_Wayback machine.

"Low-Noise Exit Guide Vanes for Turbofan Jet Engines," National Aeronautics and Space Administration, 2 pps. 2009, see NPL Low-Noise Exit Guide Vanes far Turbofan Jet Engines_Wayback machine.

* cited by examiner

OUTLET GUIDE VANES

RELATED APPLICATIONS

The present application makes a claim of priority to International Application PCT/GB2018/051325 filed May 16, 2018, which in turn makes a claim of priority to GB Application No. GB1707836.1 filed May 16, 2017 and GB Application No. GB1719662.7 filed Nov. 27, 2017.

BACKGROUND

The majority of modern commercial and military aircraft are powered by turbofan jet engines.

Engine noise arises from the jet exhaust itself and also from the fan blade which draws the air into the engine. One highly effective way of reducing noise has been to increase the bypass ratio of the engine. This is the ratio of mass flow of air passing through the bypass duct to the mass flow of air passing through the core of the engine. The bypassing air greatly reduces the noise coming from the jet emerging from the engine core, however this technology has reached its limits regarding noise reduction.

Other noise reduction techniques have been developed, such as absorbing noise with special acoustic liners within the engine ducts. These have been effective in reducing noise by a further 90%. Jet engines are now up to 30 dB quieter than the first jet engines and are now producing less than 1% of the noise of early passenger planes. However, the increased numbers of planes flying still leads to significant noise pollution for people living close to airports.

Despite the developments in noise reduction technology, aircraft noise remains a major public issue particularly as a result of the global expansion of air travel and increased number of flights. Aircraft noise from jet engines impacts people living close to airports. Thus, there is a need to reduce noise further.

SUMMARY

The present invention relates to a modification of a component of a turbofan engine which is responsible for a significant proportion of the noise generated by the engine.

In a turbofan engine, the turbofan draws air into the engine. In so doing the air flow becomes highly turbulent. In the bypass ducts, Outlet Guide Vanes (OGV's) straighten out the flow and so reduce the turbulence and noise. The OGV's are a set of independent aerofoils fixed across the bypass ducts at a low angle of attack—usually zero+/−4°.

The OGV's are themselves a major source of noise. Turbulent flow from the turbofan, interacts with the OGV aerofoils generating noise both from the interaction of the flow with the leading edge and trailing edge. Leading edge noise is the dominant source of noise from an OGV.

Small reductions in OGV noise can be achieved by varying their geometry but other means of reducing the noise would be highly beneficial.

It has been discovered that a source of noise is a result of the fluctuations of the pressure difference between the two sides of the OGV. These rapid fluctuations produce vibrations in the air which are highly audible and distinct from the noise coming from the general turbulence.

According to the present invention, there is provided an outlet guide vane for a jet engine, comprising an aerofoil having a leading edge and a trailing edge, wherein at least part of the leading edge of the outlet guide vane is porous. The term "leading edge" does not necessarily refer to the singular point where the air meets the aerofoil, but, as is common, is used in this specification to refer to the general area of the aerofoil in the vicinity of this point (i.e. the first portion of the aerofoil in the chordwise direction).

With the invention, the noise generated by the outlet guide vane, can be significantly reduced by providing to the OGV leading edge a porous section which may provide a damping effect on the vibrations, and reduces noise. Major reductions of broadband noise can be achieved of up to 7 dB in the 1 kHz to 10 kHz range. Surprisingly and beneficially, this frequency range is the range to which the human ear is most sensitive. Noise reductions are particularly apparent at angles of attack which are zero or close to zero. An OGV normally operates with an angle of attack that is small or zero at cruise though the angle of incidence of the airflow can change at approach and take off as it is a combination of direct flow and circumferential flow.

While it would be expected that departing from a conventional solid smooth leading edge would increase drag and thus reduce the efficiency of the engine, it is found with the invention that this reduction in noise is achieved without significantly increasing drag at the angles of incidence at which an OGV normally operates, and thus without reducing the efficiency of the engine.

The noise reduction effect is particularly strong when the porous area covers up to 20% of the leading edge area extending chordwise from the leading edge, more preferably up to 15%, yet more preferably up to 10%.

The porous area may extend to cover the entire span of the leading edge of the OGV or can cover portions of the leading edge trading off between noise reduction and impact on aerodynamic performance. An example would be where the radially outer 30% to 10%, of the span of the leading edge is porous.

The porous leading edge has the additional benefit in that it suppresses the separation of the airflow in the leading edge region which can otherwise occur even at small angles of attack. When this separation occurs it generates its own low frequency noise. The porous leading edge provides a large reduction of this noise.

The porosity can be up to 90% however high porosities can generate noise at angles of attack greater than zero due to cross flow. Preferably porosities of 10 to 60% will be used to provide the best noise reduction without generating additional cross flow noise. The porosities can be defined as Fine (e.g. 10-60%) or Coarse (80-90%). Fine porosities provide better noise reduction in certain frequency bands. One example of fine porosity would be pore sizes (diameter) in the range 0.2-0.4 mm. One example of coarse porosity would be pore sizes (diameter) in the range 0.4-1.0 mm.

The porous section may extend along the whole radial extent of the outlet guide vane, or only over part of it. In one example the porous section extends only over a radially outer part of the leading edge. For example, if the radially inner end of the outlet guide vane is defined as 0% of the radial extent and the radially outer end of the outlet guide vane adjacent the engine housing is defined as 100% of the radial extent, the porous section preferably extends radially outwardly from a point at 50%, 60%, 70%, 80%, 90%, or 95% of the radial extent. The porous section may end at a at point 100% of the radial extent—i.e. the outer end of the outlet guide vane, or may stop short, e.g. 5%, 10%, or 15% short, with the proviso that it must have an extent of at least 5% of the total radial length of the outlet guide vane. Preferably 10-30% of the radial extent of the leading edge portion is porous, the porous section being in the outer part of the outlet guide vane's radial extent.

Optionally, the porous section of the leading edge comprises an inner layer and an outer layer, wherein the outer layer has a lower porosity than the inner layer.

Optionally, the porous section of the leading edge further comprises at least one intermediate layer between the outer layer and the inner layer. The porosity may be chosen to be between that of the outer layer and inner layer, or may be chosen relative to one of the porosities. There may be multiple intermediate layers such that the porosity changes gradually from the outer layer to the inner layer.

According to the present invention, there is also provided a turbofan engine comprising an outlet guide vane as above.

According to the present invention, there is also provided a method of reducing outlet guide vane noise in a jet engine by providing an outlet guide vane as above.

BRIEF DESCRIPTION OF DRAWINGS

The present invention will now be described by way of example only with reference to the accompanying drawings, in which.

DETAILED DESCRIPTION

An outlet guide vane for a jet engine will now be described with reference to FIGS. 1-8.

Figure 1:
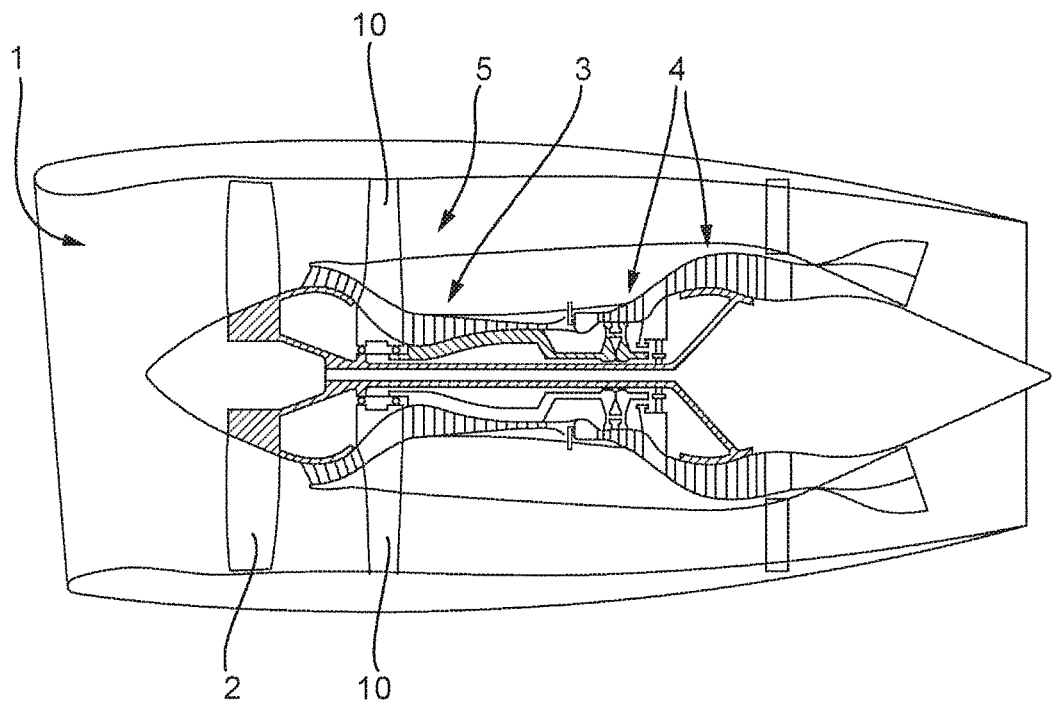
FIG. 1 is a schematic of a typical turbofan jet engine.
Figure 6:
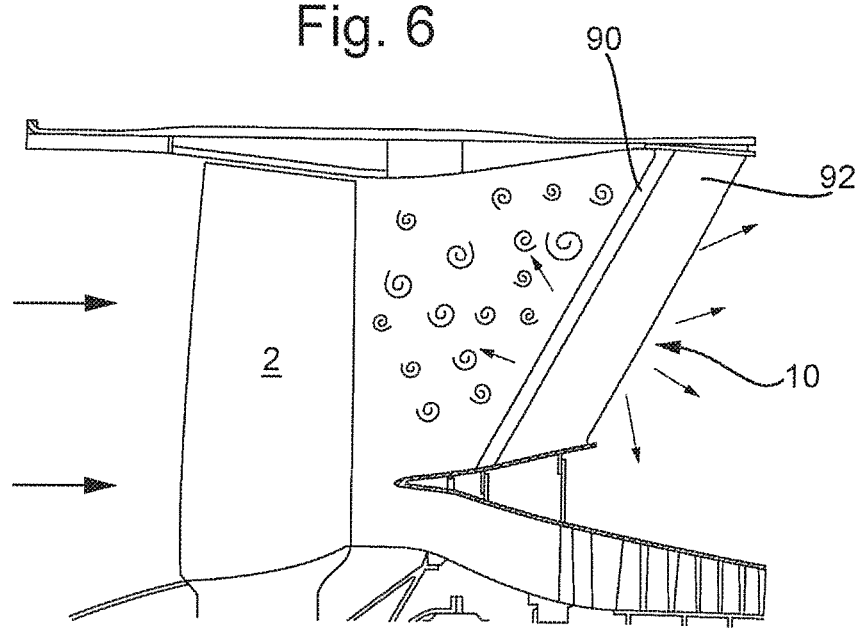
FIG. 6 shows an enlarged view of the part of the engine of FIG. 1.

FIG. 1 shows a schematic of a typical turbofan engine. Air enters the engine through the inlet duct 1 and passes through the fan 2. Some of the air passes into the core of the engine (and subsequently through the compressor 3, combustion chamber and turbine 4), and the remainder of the air passes through the bypass duct 5. As shown in FIG. 1, outlet guide vanes 10 are mounted in the bypass duct 5 after the fan 2. There may be any number of outlet guide vanes 10 distributed circumferentially around the bypass duct 5. FIG. 6 shows an enlarged view of the part of the engine with the fan blades 2 and outlet guide vane 10.

Figure 2:
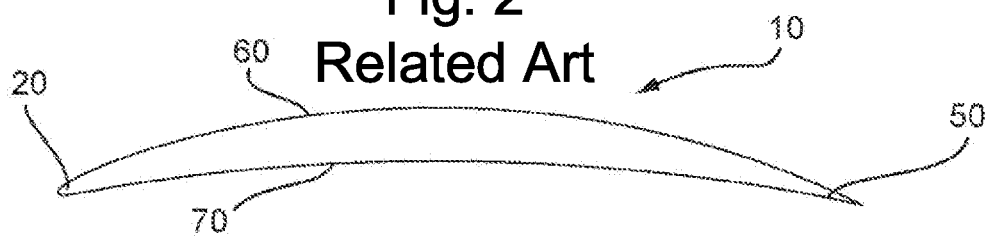
FIG. 2 is a cross-sectional view, parallel to the chord, of a typical conventional outlet guide vane.

As shown in FIG. 2, the outlet guide vane comprises an aerofoil 10, which extends in a chordwise direction between its leading edge 20 and its trailing edge 50. The air in the bypass duct of the jet engine approaches the leading edge 20, and bifurcates, with some of the air passing over the low pressure (or suction) surface 60, and some of the air passing over the high pressure surface 70 (also known simply as the "pressure surface"). The air travels along the length of the aerofoil and passes over the trailing edge.

The leading edge of the aerofoil is the part of the aerofoil at the front, extending backwards from the point where air first meets the aerofoil when it flows over the aerofoil. In other words, it can be considered to be the point of 0% chord, with the trailing edge being the point of 100% chord. However, as mentioned above, the term "leading edge" does not necessarily refer to the singular point where the air meets the aerofoil, but is often used (and is so used in this specification) to refer to the general area of the aerofoil in the vicinity of this point (i.e. the first portion of the aerofoil in the chordwise direction).

In accordance with one embodiment of the invention at least one porous section 30, is provided at, or in the area near, the leading edge 20 of the aerofoil 10.

The porous section may be positioned in an area reaching from a chordwise position at 0%, 5%, 10%, 20%, 30%, 40%, 50%, 60%, 70%, 80% or 90% of the chord, to a chordwise position at a higher percentage of the chord, such as 5%, 10%, 20%, 30%, 40%, 50%, 60%, 70%, 80% or 90% of the chord. For example, the porous section may be positioned in the first 20% of the chord from the leading edge, more preferably in the first 10% of the chord from the leading edge, and most preferably in the first 5% of the chord from the leading edge. Alternatively, the porous section may be positioned in a region between 5% and 10% chord, between 5% and 20% chord, or 10% at 20% chord.

The chordwise position of the porous section may also be chosen in accordance with an aerodynamic, rather than geometric measurement of the aerofoil. For example, the position may be chosen in relation to the centre of pressure of the aerofoil, the point of maximum pressure difference between the high pressure side and low pressure side, the point of maximum thickness of the aerofoil or the point of maximum curvature of the high pressure side or low pressure side. The porous section may be substantially centred on, forward of, or distributed around the aforementioned positions.

The porous section may be along whole or part of the leading edge of the outlet guide vane in the spanwise direction, or may be distributed in a predetermined pattern, with some portions including porous sections and some not. Thus, for example, 50% of the leading edge in the spanwise direction may be porous and 50% may be solid (free of pores, as in a conventional aerofoil for an outlet guide vane). Alternatively, less than 50% of the leading edge in the spanwise direction may be porous preferably 5-20% of the spanwise extent. It is advantageous if the porous section is in the radially outer half of the span, more preferably the outer 10% or 15%.

Figure 3:
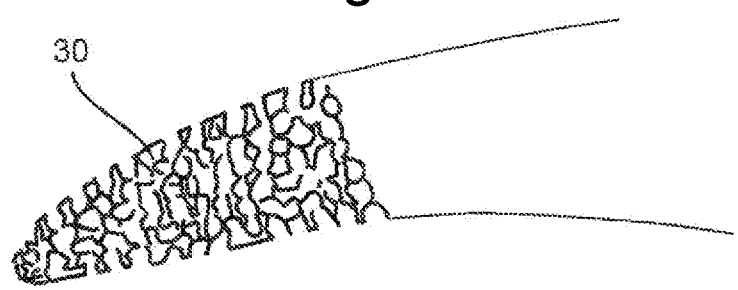
FIG. 3 is a cross-sectional view, parallel to the chord, of the leading edge of an outlet guide vane according to a first embodiment of the invention.

In a first embodiment, as shown in FIG. 3 the porous section 30 provides a network of interconnected channels which pass between the high pressure surface 70 and the low pressure surface 60 at the area around the leading edge. In order to provide the necessary strength and rigidity, the leading edge may be made of, for example, an open pore ceramic, a metal foam, e.g. of alloy, or open pore aluminium/aluminium alloy. Example porosities usable with the invention are in the range of 5% to 95%, more preferably 5 to 60%. Example pore sizes (diameter) are pores of 0.2-1.0 mm, more preferably 0.2-0.4 mm. Alternatively, coarse pores of 0.4-1.0 mm may be used.

The use of a porous material may allow high pressure air to pass through to the low pressure side of the aerofoil, whilst maintaining structural integrity and allowing the aerofoil to withstand high aerodynamic loads. It may also damp the noise generated by or impinging on this area of the OGVs.

The entire length of leading edge of the aerofoil in the spanwise direction may be made of a porous material.

Alternatively, there may be alternating sections of porous material and solid material along the span of the aerofoil.

Figure 4:
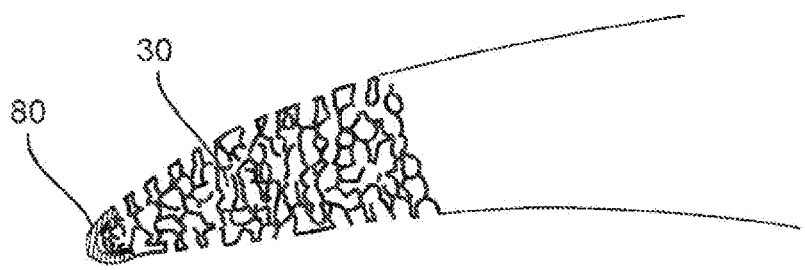
FIG. 4 is a cross-sectional view, parallel to the chord, of the leading edge of an outlet guide vane according to a first embodiment of the invention.

FIG. 4 shows a first modified version of the first embodiment in which the frontmost part 80 of the leading edge is solid, with the porous portion 30 located behind it. Alternatively, the frontmost portion can be sheathed. In this case, the porous section is substantially along a proportion of the chord (as set out above), but not at the frontmost section (i.e. where the leading edge stagnation point is).

Figure 5:
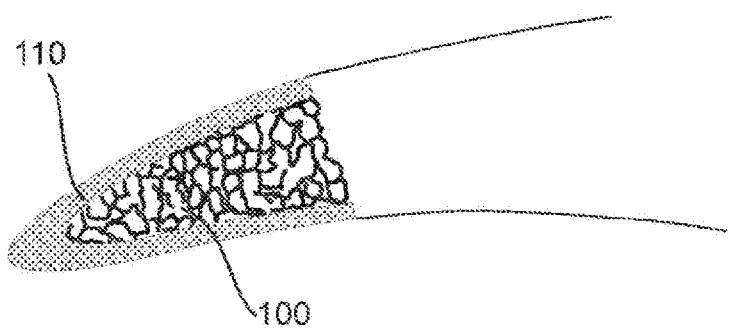
FIG. 5 is a cross-sectional view of the leading edge of an outlet guide vane according to a second embodiment of the invention.

FIG. 5 shows a second embodiment in which the leading edge is made of an inner layer 100 of porous material and an outer layer 110 of porous material. The porosity of the inner layer 100 is higher than the porosity of the outer layer 110. That is, there is more empty volume in the inner layer 100 than the outer layer 110. In other words, the holes in the outer layer 110 of porous material appear smaller than the holes in the inner layer 100 of porous material. The smaller holes in the outer layer 110 (i.e. on the surface of the aerofoil) minimise additional drag which might be caused by the porous surface, and the larger holes in the inner layer 100 allow air to travel easily through the aerofoil from the high pressure side to the low pressure side.

Additionally, there may be one or more intermediate layers positioned between the inner layer 100 and the outer layer 110. The porosity of the one or more intermediate layers may be between the porosity of the inner layer 100 and the outer layer 110. Alternatively, the porosity of the one or more intermediate layers may be higher than, lower than, or equal to the porosity of the inner layer 100 or outer layer 100. There may be multiple intermediate layers such that the porosity changes gradually from the outer layer to the inner layer.

Figure 7A:
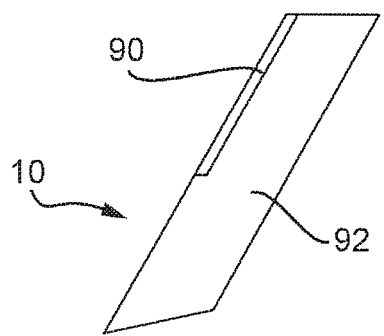
FIGS. 7(A) to (F) illustrate modified outlet guide vanes according to embodiments of the invention.
Figure 7B:
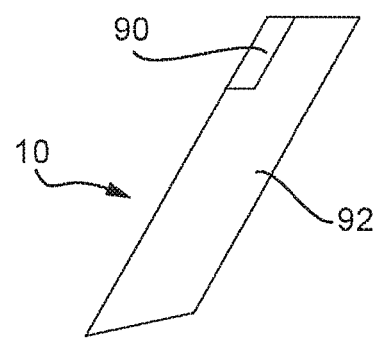
Figure 7C:
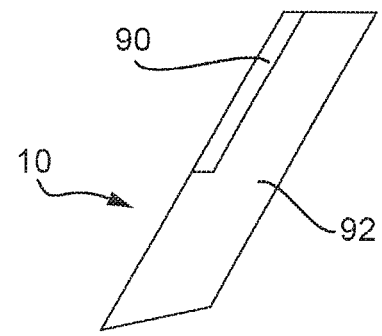
Figure 7D:
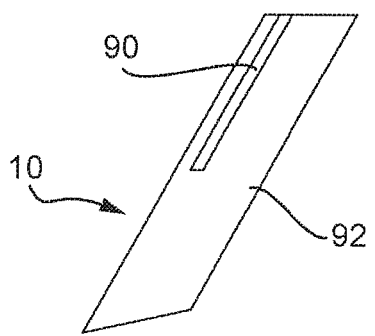
Figure 7E:
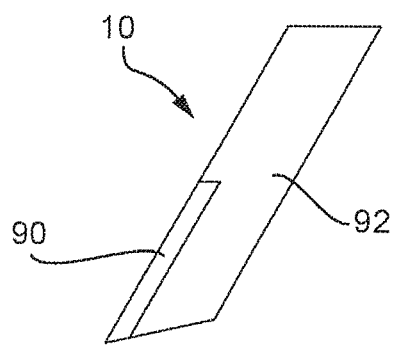
Figure 7F:
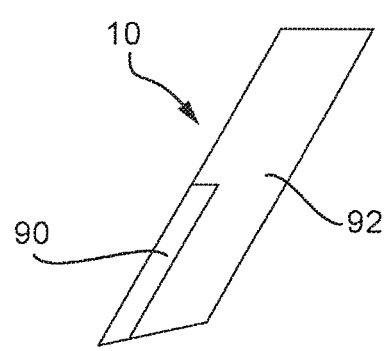

FIG. 6 shows an OGV according to an embodiment of the invention in situ in an engine. The porous section 90 extends along the whole leading edge of the span, and extends over the leading 10% chordally. The remainder 92 of the OGV is solid. FIG. 7A shows a modified OGV according to the invention with a similar chord porous section extending over the radially outer half of the OGVs. FIG. 7B shows a modified OGV according to the invention with a porous section 90 with a deeper chordal extent—about 25% of the chord, but a shorter radial extent—the outer fifth. FIG. 7C shows a modified OGV according to the invention with a porous section 90 with 20% chordal extent and radially extending over the outer half of the OGVs. FIG. 7D shows a modified OGV according to the invention with a porous section 90 spaced from the front edge of the OGVs. FIGS. 7E and F show OGVs according to the invention in which porous sections 90 of respectively 15% and 25% chordal extent, are positioned on the radially inward half of the OGVs.

Figure 8:
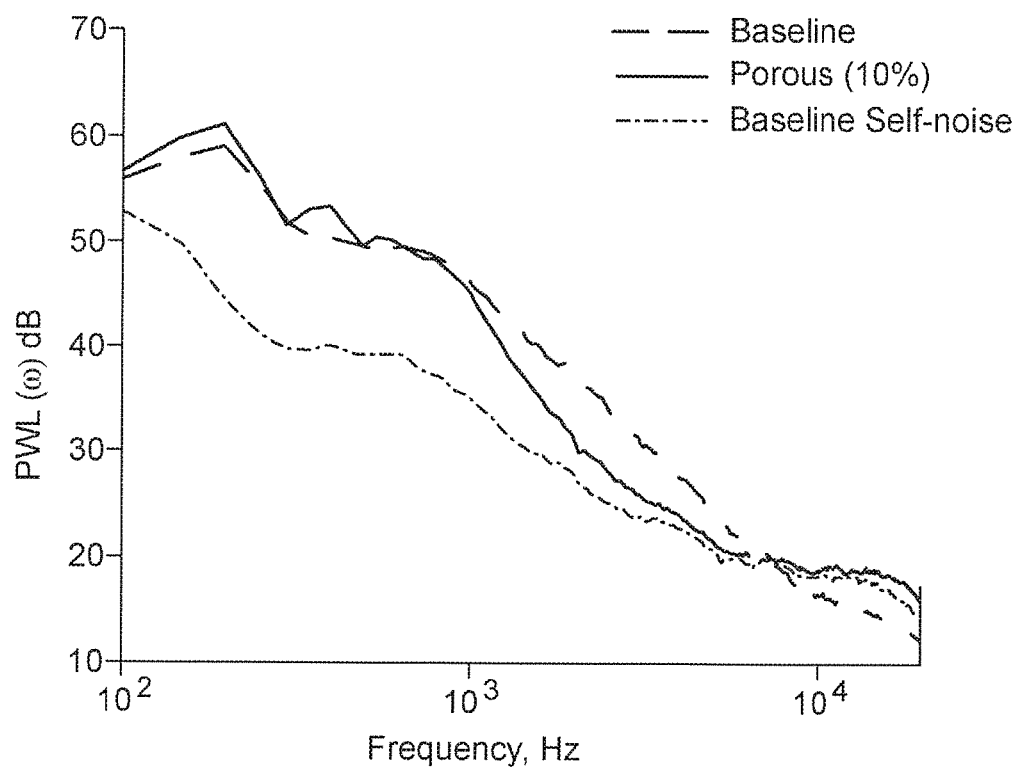
FIG. 8 is a graph showing the noise reduction achieved with an embodiment of the present invention.

FIG. 8 illustrates the noise reduction achieved with an embodiment of the invention in which an OGV with a leading edge comprising a porous alloy foam with a porosity of 90% and around 50 pores per inch of estimated average diameter 0.4 mm. The porous section extends from the front edge to 10% of the chord and the OGV is placed at zero degrees angle of attack in an airstream at 40 m/s. As can be seen, compared to a solid conventional OGV (marked "Baseline" in FIG. 10) there is a significant reduction in noise of up to 7 dB over most of the 1 kHz to 10 kHz frequency range.

The invention claimed is:

1. An outlet guide vane for an aircraft engine, comprising an aerofoil having a leading edge and a trailing edge, wherein at least part of the leading edge of the outlet guide vane is porous to provide a porous section, wherein the porous section extends over a total chordal extent of between 5% and 25% of an overall chord of the outlet guide vane, wherein the porous section starts proximate a front of the leading edge and extends chordwise backwards to a solid, non-porous section of the aerofoil which continuously extends from the porous section to the trailing edge, wherein the porous section is formed of a rigid, porous material defining a network of channels which extend through the aerofoil from a high pressure surface to a low pressure surface of the aerofoil, the porous material comprising a structurally rigid foam, wherein the porous material comprises an inner layer and an outer layer, wherein the outer layer has a first porosity range adjacent the high pressure surface and adjacent the low pressure surface, and wherein the inner layer has a second porosity range higher than the first porosity range.

2. The outlet guide vane according to claim 1, wherein the outer layer continuously extends along the leading edge of the aerofoil from the high pressure surface to the lower pressure surface to surround the inner layer so that the lower first porosity range of the outer layer reduces drag on the aerofoil and the larger second porosity range of the inner layer facilitates air flow through the aerofoil from the high pressure surface to the low pressure surface.

3. The outlet guide vane according to claim 1, wherein the porous material further comprises at least one intermediate layer between the outer layer and the inner layer, the at least one intermediate layer having a third porosity range between that of the respective outer and inner layers to provide a transition in porosity from the outer layer to the inner layer.

4. An outlet guide vane according to claim 1, wherein the porous section is positioned only in a radially outer part of the leading edge.

5. An outlet guide vane according to claim 1, wherein 10-30% of a radial extent of the leading edge is porous.

6. An outlet guide vane according to claim 1, wherein the structurally rigid foam comprises a porous ceramic foam or a metal foam.

7. An outlet guide vane according to claim 1, wherein the porous section is in an outer half of the outlet guide vane's radial extent.

8. An outlet guide vane according to claim 1, wherein the porous section is 5-20% of a total chordal extent of the outlet guide vane in a front third of the outlet guide vane.

9. An outlet guide vane according to claim 1, wherein the porous material of the porous section has a porosity of from 5% to 60%.

10. A turbofan engine comprising the outlet guide vane according to claim 1.

11. A method of reducing outlet guide vane noise an aircraft engine by providing the aircraft engine with at least one outlet guide vane of claim 1.

12. An outlet guide vane according to claim 1, wherein the porous section begins at the front of the leading edge.

13. An aircraft engine comprising a fan, a duct and an outlet guide vane, the outlet guide vane disposed in the duct downstream of the fan and comprising an aerofoil having a leading edge and a trailing edge, wherein at least part of the leading edge of the aerofoil is porous to provide a porous section to reduce noise generated by the aircraft engine, wherein the porous section is formed of a rigid, porous material that extends through the aerofoil from a high pressure surface to a low pressure surface of the aerofoil adjacent the leading edge, the porous section adjoining a non-porous section formed of solid material that extends from the high pressure surface to the low pressure surface adjacent an intermediate portion of the aerofoil and from the porous section to the trailing edge including a thickest extent of the intermediate portion of the airfoil, the porous material comprising a foam that imparts structural rigidity to the aerofoil adjacent the leading edge, the porous material further comprising an inner layer and an outer layer, the outer layer having a first porosity range adjacent the high pressure surface and adjacent the low pressure surface, and the inner layer having a second porosity range higher than the first porosity range so that the lower first porosity range of the outer layer reduces drag on the aerofoil and the larger second porosity range of the inner layer facilitates air flow through the aerofoil that enters the high pressure surface and exits the low pressure surface.

14. The aircraft engine of claim 13, wherein the porous section has a total chordal extent of from 5% to 25% of an overall chord of the outlet guide vane.

15. The aircraft engine of claim 13, wherein the porous section starts proximate a front of the leading edge and extends chordwise backwards.

16. The aircraft engine of claim 13, wherein the porous section is positioned only in a radially outer part of the leading edge.

17. The aircraft engine of claim 13, wherein the the outer layer continuously extends adjacent the leading edge from the high pressure surface to the low pressure surface to surround the inner layer.

18. The aircraft engine of claim 13, wherein the porous section is in an outer half of a radial extent of the aerofoil.

19. The aircraft engine of claim 13, wherein the porous material has a porosity of from 5% to 60%.

20. The aircraft engine of claim 13, wherein the porous material extends no more than a maximum of 20% of an overall chordal length of the aerofoil as measured beginning from an outermost tip of the leading edge of the aerofoil.

\* \* \* \* \*